United States Patent
Hanumara et al.

(10) Patent No.: US 9,383,910 B2
(45) Date of Patent: Jul. 5, 2016

(54) AUTOSCROLL REGIONS

(71) Applicant: Microsoft Technology Licensing, LLC, Redmond, WA (US)

(72) Inventors: Poornima Hanumara, Seattle, WA (US); Benjamin Edward Rampson, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 265 days.

(21) Appl. No.: 14/046,522

(22) Filed: Oct. 4, 2013

(65) Prior Publication Data

US 2015/0100916 A1  Apr. 9, 2015

(51) Int. Cl.
  *G06F 3/0481* (2013.01)
  *G06F 3/0488* (2013.01)
  *G06F 3/0485* (2013.01)
  *G06F 3/0484* (2013.01)

(52) U.S. Cl.
  CPC ............ *G06F 3/0485* (2013.01); *G06F 3/0481* (2013.01); *G06F 3/0488* (2013.01); *G06F 3/04842* (2013.01)

(58) Field of Classification Search
  CPC ............................... G06F 3/0485; G06F 3/0481
  USPC ........................................................ 715/785
  See application file for complete search history.

(56) References Cited

U.S. PATENT DOCUMENTS

| | | | |
|---|---|---|---|
| 5,196,838 A | 3/1993 | Meier et al. | |
| 5,528,260 A | 6/1996 | Kent | |
| 5,710,894 A | 1/1998 | Maulsby et al. | |
| 6,211,879 B1 * | 4/2001 | Soohoo | 715/854 |
| 6,559,873 B1 * | 5/2003 | Dawkins | G06F 3/0482 715/856 |
| 7,061,474 B2 | 6/2006 | Hinckley et al. | |
| 8,108,792 B2 | 1/2012 | Lin-Hendel | |
| 8,392,848 B2 | 3/2013 | Gould | |
| 2002/0145631 A1 * | 10/2002 | Arbab et al. | 345/786 |
| 2006/0101384 A1 | 5/2006 | Sim-Tang et al. | |
| 2007/0024646 A1 | 2/2007 | Saarinen et al. | |
| 2012/0066638 A1 | 3/2012 | Ohri | |
| 2013/0091473 A1 | 4/2013 | Rampson et al. | |

OTHER PUBLICATIONS

Beginner Tips for SEO, "Google Analytics for Beginners: Selecting a Date Range", Published on: Apr. 1, 2008, Available at: https://www.youtube.com/watch?v=NTkeW7AsYsc, 1 page.

Howtechweb, "How to Use Yahoo Calendar," Published on: Jun. 9, 2013, Available at: https://www.youtube.com/watch?v=PXtLSToaMJg, 2 pages.

PCT Search Report mailed Nov. 17, 2014 for PCT Application No. PCT/US2014/058504, 14 pages.

(Continued)

*Primary Examiner* — Matt Kim
*Assistant Examiner* — David Luu
(74) *Attorney, Agent, or Firm* — Damon Rieth; Tom Wong; Micky Minhas

(57) ABSTRACT

Technologies are described herein for autoscroll regions. A device establishes a trigger line near an edge of a selectable region of content that is adjacent to a non-selectable region of content. The device detects user input within the selectable region and detects movement of the user input that intersects the trigger line. In response to detecting the user input intersecting the trigger line, the device scrolls a scrollable region.

20 Claims, 13 Drawing Sheets

(56) References Cited

OTHER PUBLICATIONS

MacHelpers, "How to Use the Calendar App in iOS 7", Published on: Oct. 1, 2013, Available at: https://www.youtube.com/watch?v=4LG6WzBjrUU, 1 page.

Sirmorphalot, "Google Calendar—Tutorial 1—Basics", Published on: Oct. 1, 2009, Available at: https://www.youtube.com/watch?v=-X5z1UmeBhU, 1 page.

"Form.AutoScroll Property," Oct. 2, 2011, downloaded from http://msdn.microsoft.com/en-us/library/a62htd5x(v=vs.71).aspx, 3 pp.

* cited by examiner

AUTOSCROLL REGIONS

BACKGROUND

Touch-enabled devices commonly provide user interfaces for selecting various types of data. For example, a touch-enabled calendar application may provide user interfaces for selecting dates and/or ranges of dates. Some touch-enabled user interfaces for selecting data may be confusing and difficult to manipulate. For example, selecting ranges of dates in a touch-enabled calendar application may be a non-intuitive process when the entirety of the content to be selected, such as a range of dates, cannot be displayed on-screen concurrently.

It is with respect to these and other considerations that the disclosure made herein is presented.

SUMMARY

Technologies are described herein for providing autoscroll regions within a user interface ("UI"). Utilizing an implementation of the concepts and technologies disclosed herein, a touch-enabled UI may be provided for selecting content, such as ranges of dates, which may be more intuitive for users than previous UIs for selecting content.

According to one embodiment described herein, a computing device may be configured to present an on-screen UI that has a scrollable region that is divided into selectable and non-selectable regions. The selectable regions contain selectable content, such as dates, while the non-selectable regions contain content that cannot be selected, such as headers. The selectable regions may be adjacent to the non-selectable regions.

The UI may be scrolled in some embodiments by establishing a "trigger line". As will be described herein, the trigger line may be utilized to determine when to scroll the UI. For example, the scrollable region may be scrolled in response to detecting the intersection of the user input with the trigger line.

In some embodiments, the computer device may detect user input within a selectable region and determine whether an edge of the scrollable region interfaces the selectable region. If so, then the trigger line may be established at the edge of the scrollable region. If not, then the trigger line may be established near an edge of the selectable region that is directly adjacent to a non-selectable region. When movement of the user input is detected from an initial selection point within the selectable region to the trigger line, content presented within the scrollable region may be scrolled until another selectable region appears. The trigger line may be reestablished at the edge of the scrollable region that interfaces the previously off-screen selectable region. Content between and including the initial selection point and a final selection point of the user input may be selected.

It should be appreciated that the above-described subject matter may also be implemented as a computer-controlled apparatus, a computer-implemented process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
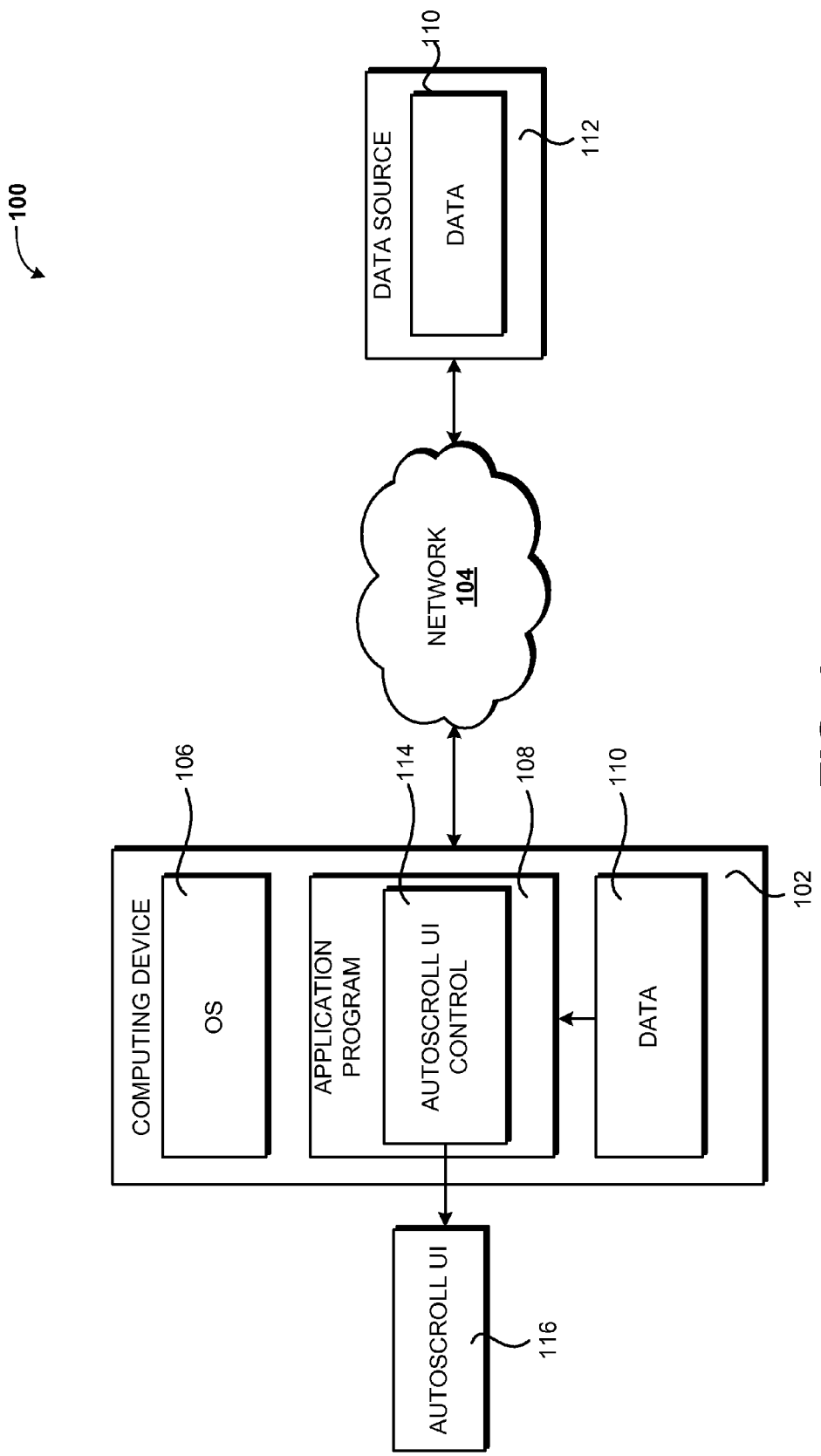
FIG. 1 is a system diagram showing aspects of an illustrative operating environment and aspects of the operation of an autoscroll UI control for providing an autoscroll UI, according to one embodiment disclosed herein.

The following detailed description is directed to concepts and technologies for providing autoscroll regions within a UI. According to the concepts and technologies described herein, a computing device may present a UI that includes autoscroll regions for selecting content, such as ranges of dates or other types of content. A UI utilizing the autoscroll regions disclosed herein may be presented and utilized in situations where content is to be displayed and selections made therefrom, but where the amount of content to be displayed exceeds the area of the UI allocated to display the content.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration of specific embodiments or examples. Referring now to the drawings, in which like numerals represent like elements throughout the several figures, aspects of a computing system, computer-readable storage medium, and computer-implemented methodology for providing autoscroll regions will be described.

Referring now to FIG. 1, a system diagram showing aspects of an illustrative operating environment 100 for various embodiments of the concepts and technologies disclosed herein will be described. The operating environment 100 shown in FIG. 1 includes a computing device 102, which may be referred to herein as the "device 102." In some embodiments, the device 102 operates as part of, or in communication with, a communications network ("network") 104, though this is not necessarily the case. According to various embodiments, the device 102 is a personal computer ("PC") such as a desktop, tablet, or laptop computer system. In other embodiments, the device 102 is another type of computing system including, but not limited to, a handheld computer, a netbook computer, an embedded computer system, a personal digital assistant ("PDA"), a mobile telephone, a smart phone, or another computing system. Thus, the device 102 is primarily described herein as being a smartphone having a multi-touch-sensitive display, it should be understood that this embodiment is illustrative, and should not be construed as being limiting in any way.

The device 102 may be configured to execute an operating system 106 and an application program 108. The operating system 106 is a computer program for controlling the operation of the device 102. The application program 108 is an executable program configured to execute on top of the operating system 106 to provide various functions. According to various implementations, the application program 108 may be, but is not limited to being, a calendar, a web browsing program, multimedia software, a stand-alone application, and the like. The application program 108 may also be configured to receive or store data 110 and/or to execute various operations with respect to the data 110. It should be noted that although the device 102 has been described with reference to a single operating system 106 and a single application program 108, there may be multiple instances of these elements. The examples listed thus far are only illustrative of certain embodiments and should not be construed as being limiting in any way.

In some implementations, the data 110 is stored at the device 102 in a memory or other data storage device associated with the device 102. In other embodiments, the data 110 is obtained from a data source 112 that is operating as part of, or in communication with, a network 104. The data source 112 may be a network-connected hard drive, a server computer operating on the network 104 or in communication therewith, and/or any other device that may store or host the data 110 and/or communicate with the device 102. The data 110 may be received at and/or imported by the application program 108 for various purposes. For example, the data 110 may correspond to a text document, and the data 110 may be received at and/or imported by the application program 108 for editing or saving. It should be understood that this embodiment is illustrative, and should not be construed as being limiting in any way.

In an example embodiment, the application program 108 may be configured with an autoscroll UI control 114. The autoscroll UI control 114 may include, in various embodiments, computer-executable code that, when executed by the device 102, causes the device 102 to present an autoscroll UI 116 that allows a user to manipulate and select content during overall interactions with the applications. The applications may include the application program 108 executed by the device 102, or applications or resources viewed at or with the device 102. The content may include data 110 that is destined to be formatted for display and contained within the autoscroll UI 116. The autoscroll UI 116 might also be provided by the operating system 106 in some embodiments.

In some embodiments, the autoscroll UI control 114 may be used to present a discrete portion of underlying content that is too extensive to be displayed on-screen in its entirety at one time. For example, and without limitation, the autoscroll UI control 114 may be used to present, scroll, and select ranges of dates in a calendar that cannot be simultaneously displayed on a display screen of the device 102 at a single time.

The autoscroll UI control 114 may also allow for scrolling in the horizontal, vertical, or diagonal directions. By scrolling, the content displayed in a viewable area of a display provided by the device 102 may gradually move out of the viewable area in one direction and may be replaced in the viewable area by previously unseen content moving into view from an opposite direction. In various embodiments, the size of the autoscroll UI control 114 and the amount of viewable content it presents may be tailored to correspond to the size of the viewable area on the display screen provided by the device 102, or to the needs of an application designer. The content accessed by the autoscroll UI control 114 may be divided into adjacent regions, based on whether the content contained within each region has been designed to be selectable by a user. In some embodiments, regions of content that have been designed to be selectable by the user may be further divided into separate target objects that may be targeted for individual selection.

In some embodiments, the autoscroll UI control 114 is interacted with via touch gestures and/or multi-touch gestures. The touch gestures may be measured by an appropriate multi-touch display screen in the device 102, and interpreted by the autoscroll UI control 114 based upon a number of possible factors. Gestures may be interpreted based upon the location of an initial selection point on the display screen. The initial selection point may be the location of a first target object that has been targeted for selection by a user, for example, a first date in a range of dates. Gestures may also be interpreted based upon whether they are contained within the region of the initial selection point, whether they cross from one region to another, or whether they cross beyond the boundaries of the autoscroll UI 116 and into an area of the UI occupied by a different UI control.

In various embodiments, gestures may be interpreted based upon the combination of elements and/or regions traversed by the gesture. In some embodiments, gestures may be interpreted based upon the distance covered by the gesture from the initial selection point to a final selection point of the gesture. Gestures may also be interpreted based upon specialized triggers. Conditions may be established such that when a gesture satisfies a given trigger condition, a responding event is triggered. It should be noted that although user interaction has been described primarily in terms of touch gestures and multi-touch gestures, a user might interact with the device 102 using practically any means of input that communicates position and movement. The examples listed thus far are only illustrative of certain embodiments and should not be construed as being limiting in any way.

FIG. 1 illustrates one device 102, one network 104, and one data source 112. It should be understood, however, that some implementations of the operating environment 100 include multiple devices 102, multiple networks 104, and no or multiple data sources 112. Thus, the illustrated embodiments should be understood as being illustrative, and should not be construed as being limiting in any way. Additional details regarding the operation of the autoscroll UI control 114 and the autoscroll UI 116 will be provided below with regard to FIGS. 2A-7.

Figure 2A:
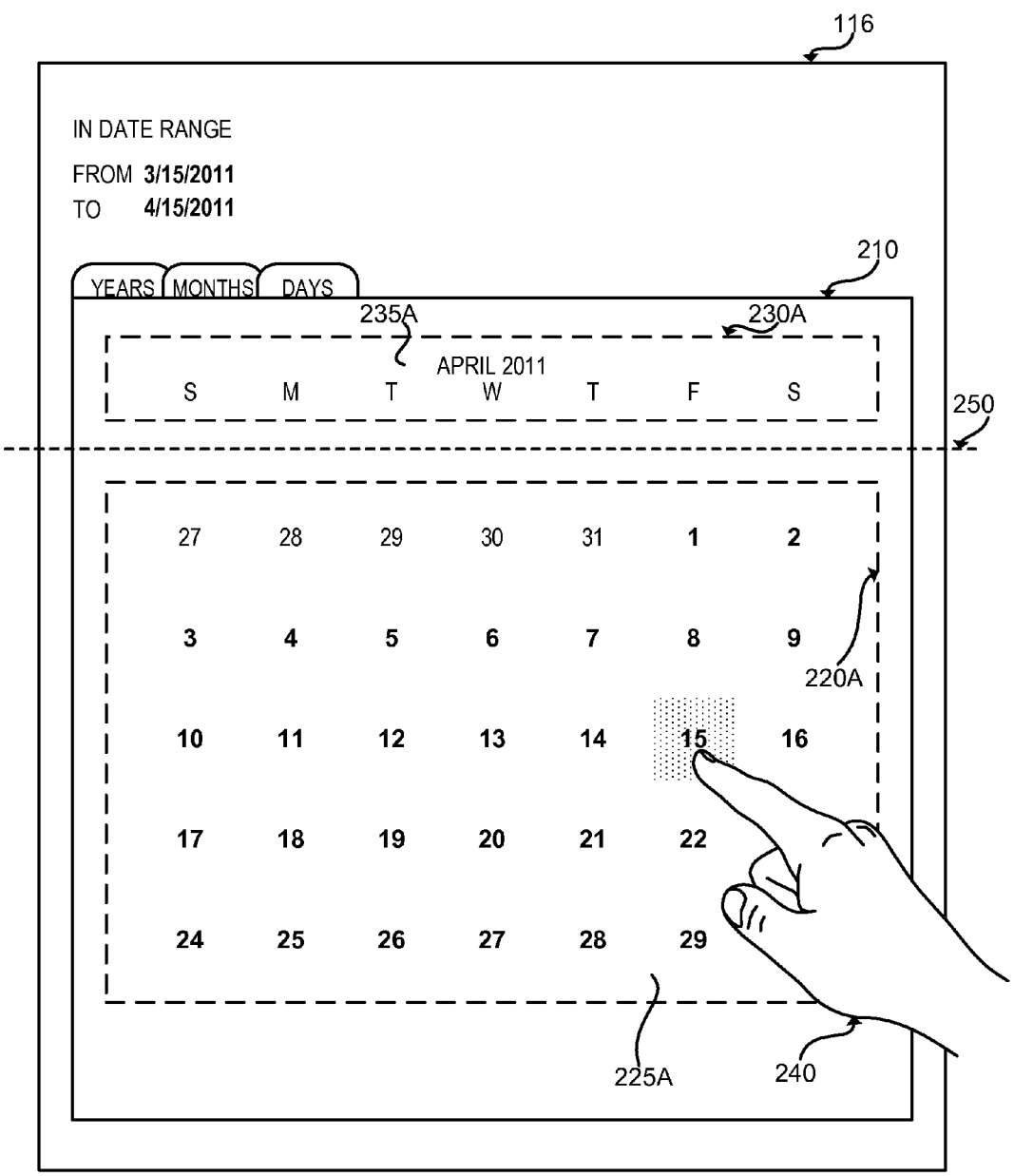
FIGS. 2A-2D are UI diagrams showing various aspects of autoscroll regions according to various illustrative embodiments disclosed herein.

Turning now to FIGS. 2A-2D, UI diagrams showing various aspects of the concepts and technologies disclosed herein for providing autoscroll regions will be described according to various illustrative embodiments. In particular, FIG. 2A shows an illustrative autoscroll UI 116 generated by the device 102. In the illustrative autoscroll UI 116 of FIG. 2A, a calendar UI is shown. Such a calendar UI may be used to select a date, or range of dates, that may be passed as parameters to an underlying application program 108, which, in this example, may be a calendar application. It should be appreciated that the UI diagram illustrated in FIG. 2A is illustrative of one contemplated embodiment, and therefore should not be construed as being limiting in any way.

As shown in FIG. 2A, the autoscroll UI 116 may be presented as a UI that occupies a portion of the viewable area of a display screen of the device 102. Within the autoscroll UI 116, a scrollable region 210 may display content. When the amount of content made available to the autoscroll UI control 114 exceeds the viewable area of the scrollable region 210, the autoscroll UI control 114 may allow for content to be scrolled into and out of the scrollable region. In various embodiments, the autoscroll UI control 114 may allow for scrolling in one or more of the horizontal, vertical or diagonal directions.

The scrollable region 210 may be divided into sub-regions based upon properties assigned to the content displayed within. For example, and without limitation, a selectable region 220A may contain selectable content 225A. Selectable content 225A may include discrete target objects that may be selected individually or in groups by the user for performing operations. The operations may include, but are not limited to, copying, cutting, changing the display properties of the target objects within the UI and setting parameters to be used by application program 108. In some embodiments, the selectable content 225A may include dates for a calendar application, text, a set of icons representing underlying files or data structures, and other types of content. The target objects may include the individual dates, individual words or letters within the text, individual icons, and other types of individually selectable content.

In one embodiment, a non-selectable region 230A lies directly adjacent to the selectable region 220A. The non-selectable region 230A may contain non-selectable content 235A that cannot be selected. In some embodiments, the non-selectable content 235A is header information used to identify columns or rows of data as in a calendar application or spreadsheet; titles, chapters, section identifiers or page numbers, as in literary works; non-modifiable data in image processing programs; or sections of whitespace. It should be understood that examples of selectable content 225A and non-selectable content 235A are illustrative of some contemplated embodiments, and should not be construed as being limiting in any way. In some embodiments, a non-selectable region 230 may lie directly adjacent to more than one selectable region 220. Similarly, a selectable region 220 may lie directly adjacent to one or more non-selectable regions 230. It should also be understood, that the demarcations depicted as bordering the identified regions within the autoscroll UI 116 and the space between each region are for the purposes of illustration only. They may or may not be present in actual embodiments and should not be construed as being limiting in any way.

The autoscroll UI control 114 may receive input and feedback from a user by way of user input, such as a touch by a user's hand 240. In various embodiments, the autoscroll UI control 114 may interpret touch or multi-touch gestures created by a user as the user interacts with the autoscroll UI 116. In some embodiments, user input may be used to make physical contact with the surface or screen of a touchscreen UI on the device 102. In other embodiments, user input may be sensed when placed near, or hovering over, the touchscreen user interface. The user input may be described herein in terms of touch and multi-touch gestures. However, it should be appreciated that other types of input might also be utilized, such as touchpad, mouse, trackball, motion-sensor or other such user input with the capability to communicate movement to the device 102. It should be understood that these embodiments are illustrative, and should not be construed as being limiting in any way.

In some embodiments, the autoscroll UI control 114 may interpret touch and multi-touch gestures based, in part, on the initial selection point of the user's hand 240. A tap-and-release gesture, accomplished when the user's hand 240 briefly touches a target object within the selectable content 225A then quickly releases the target object by lifting away, may serve as an example of an initial selection point. When the autoscroll UI control 114 detects the user's hand 240 at an initial selection point within the selectable region 220A, then detects that the user's hand 240 has been lifted, or released, the autoscroll UI control 114 interprets the gesture as selecting the content at the initial selection point for a subsequent operation. Once selected, the autoscroll UI control 114 may pass the data 110 associated with the selected content on to the associated application program 108. In the example calendar UI of FIG. 2A, tapping-and-releasing may be interpreted by the autoscroll UI control 114 as selecting a date, which will subsequently be passed as a parameter to the associated calendar application.

In some embodiments, more than one target object may be selected for subsequent operations by using a tap-and-drag gesture. A tap-and-drag gesture may be accomplished when the user's hand 240 touches a target object at an initial selection point, moves over one or more other target objects, then releases. The position of the final target object touched by the user's hand 240 prior to the user's hand 240 releasing may be the final selection point. The autoscroll UI control 114 may detect the user's hand 240 at the initial selection point within the selectable region 220A and may determine the final selection point by recording the position of the final target object touched by the user's hand 240 prior to the user's hand 240 releasing. The autoscroll UI control 114 may interpret the tap-and-drag gesture as selecting the content between and including the initial selection point and the final selection point. The autoscroll UI control 114 may pass the data 110 associated with the selected content on to the associated application program 108. In the example calendar UI of FIG. 2A and FIG. 2B, tapping the '15' and dragging the user's hand 240 to the '1' may be interpreted by the autoscroll UI control 114 as selecting a range of dates starting from Apr. 15, 2011 back to Apr. 1, 2011. The date range may subsequently be passed as a parameter to the associated calendar application.

In some embodiments, the tap-and-drag gesture may be extended to select content that spans multiple selectable regions 220. By tapping at an initial selection point, moving the user's hand 240 from one selectable region 220 containing the initial selection point to another selectable region 220, and lifting, or releasing, the user input, content in multiple selectable regions 220 from the initial selection point to the final selection point may be selected.

In some situations, only one selectable region 220 may be visible in the scrollable region 210 at a given time. When only one selectable region 220 is visible, a user may not be aware that more content is available to be selected. Furthermore, the user may not be aware of the process by which any additional content may be viewed and selected. As will be described in greater detail below, the autoscroll UI control 114 may enhance the user's experience in these situations by detecting the occurrence of a trigger condition, which signifies the user's intention to select off-screen content, and scrolling the content in the scrollable region 210 in response thereto.

In some embodiments, the autoscroll UI control 114 may establish a trigger line 250, as shown in FIG. 2A, to be used in determining whether the trigger condition has been met. The trigger line 250 may be established near an edge of a first selectable region 220A that is directly adjacent to a non-selectable region 230A. The autoscroll UI control 114 may detect the user's hand 240 within the first selectable region 220A and monitor the position and movement of the user input.

Figure 2B:
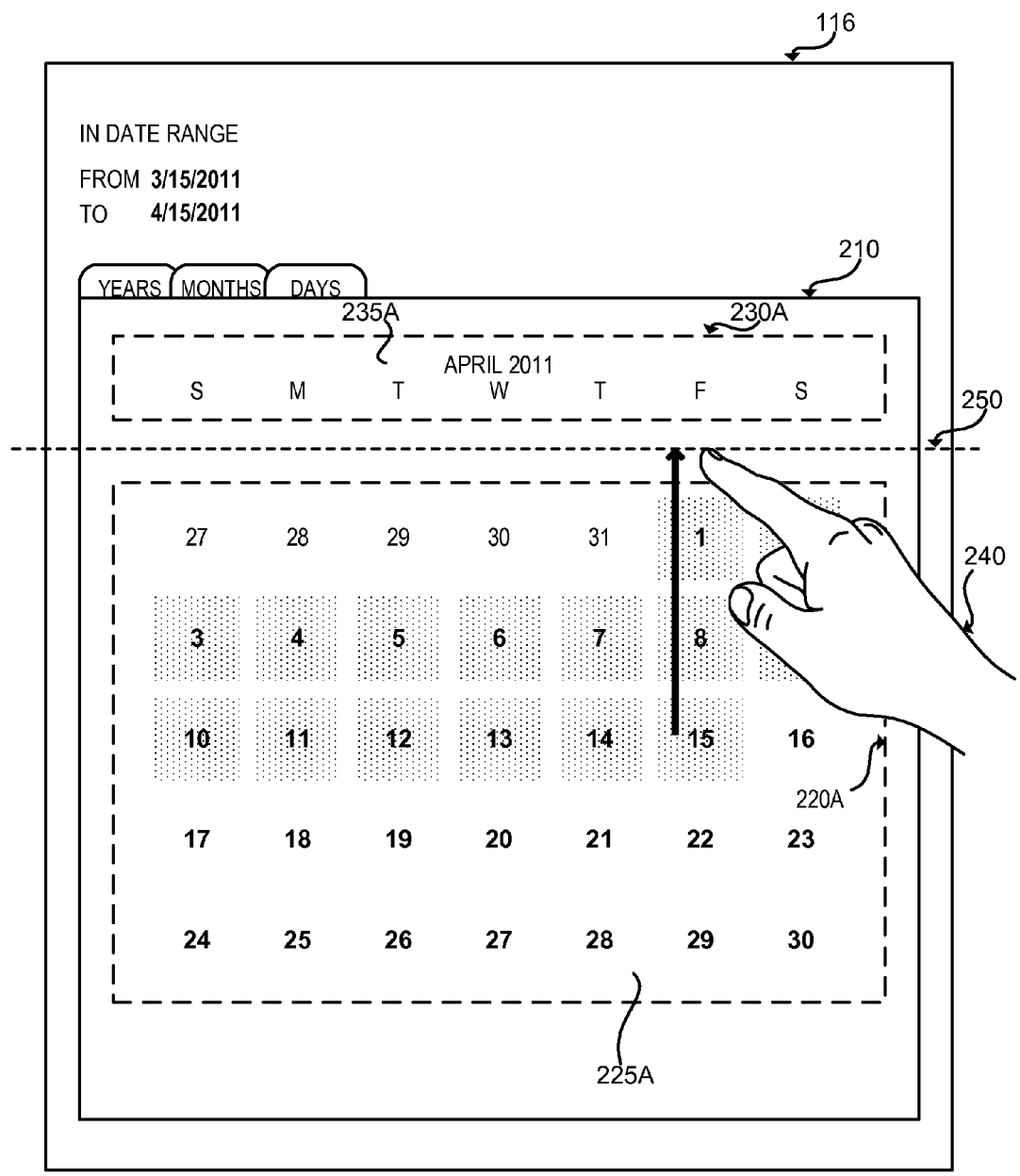
Figure 2C:
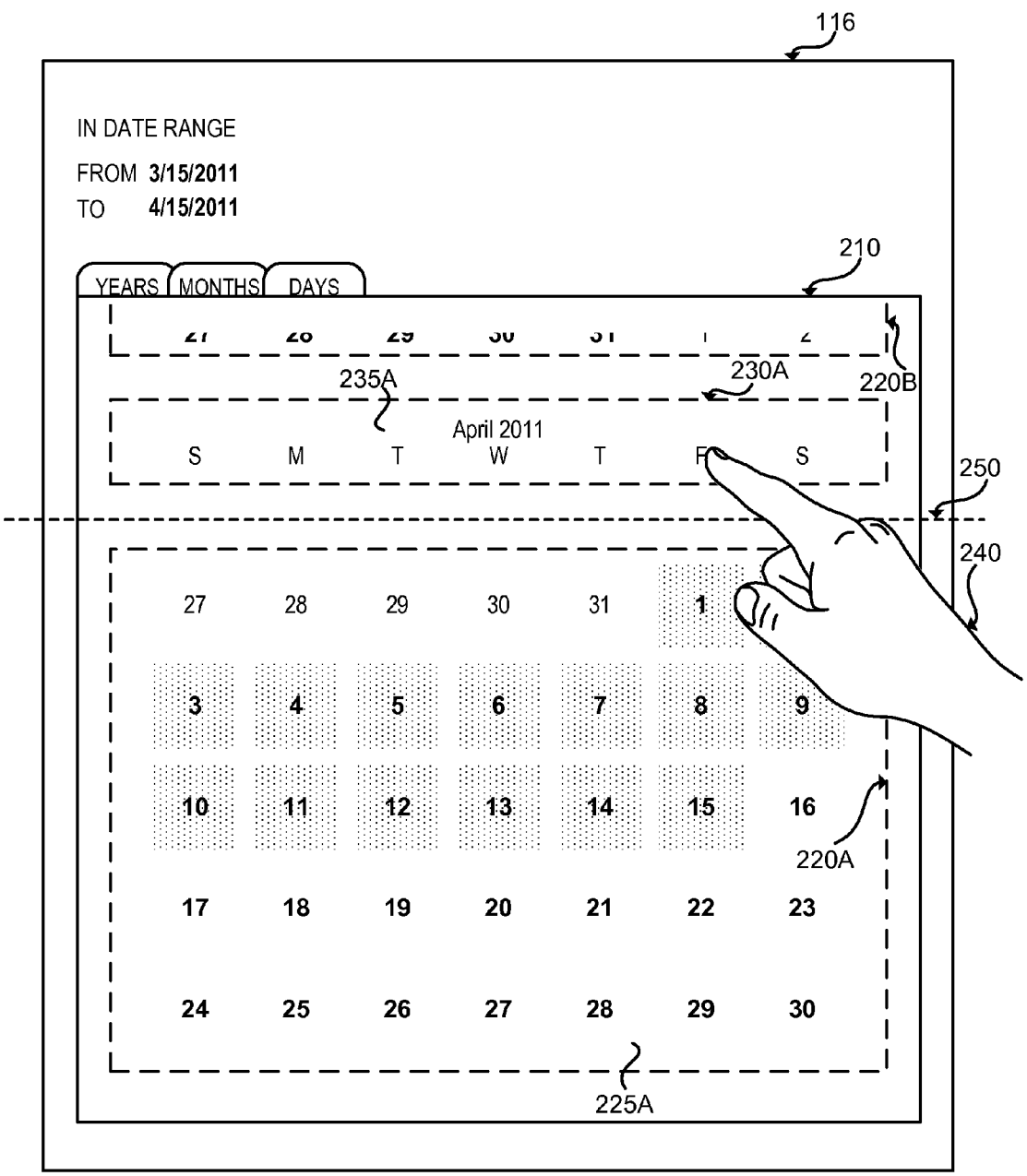
Figure 2D:
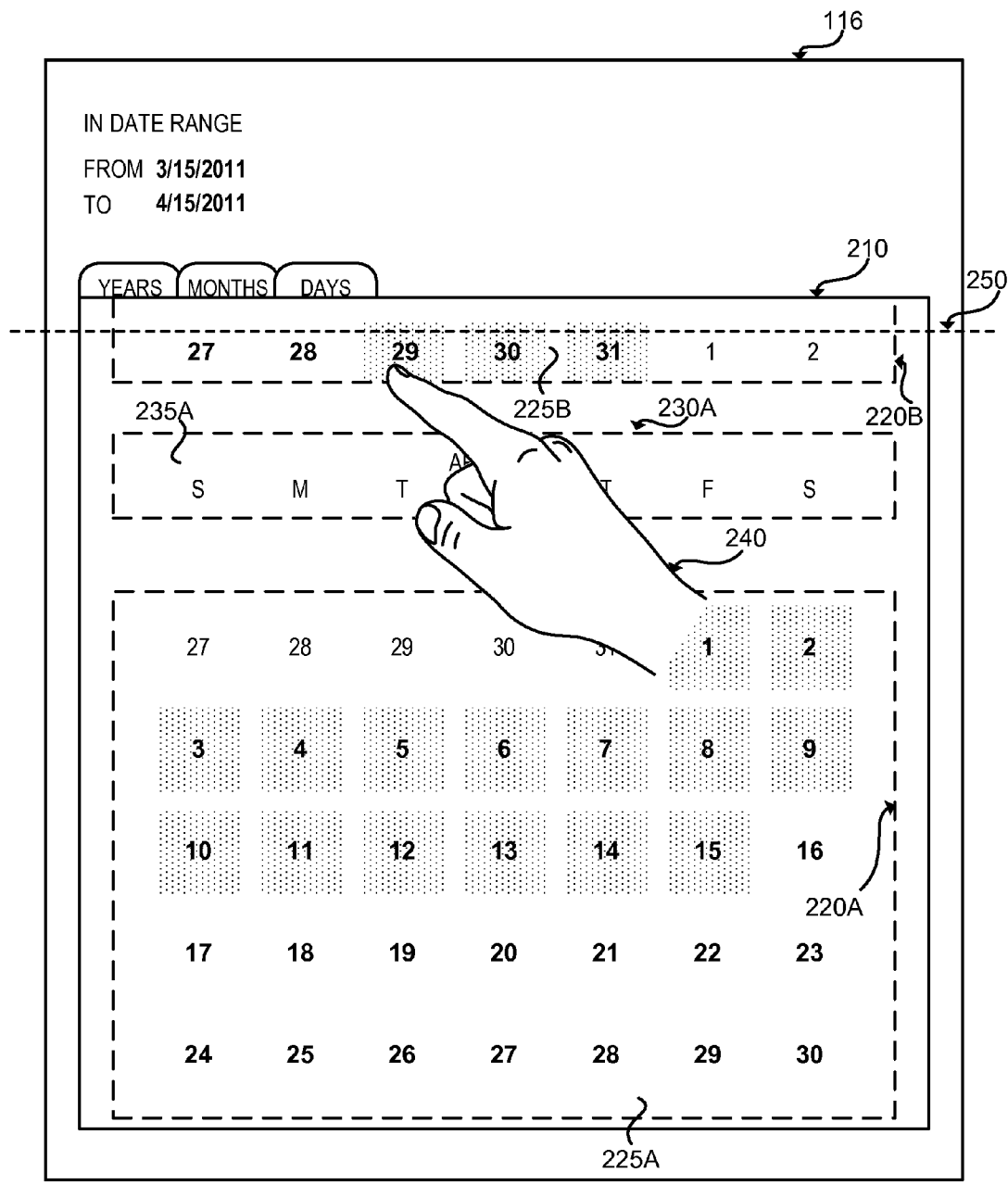

As shown in FIG. 2B, when the autoscroll UI control 114 detects movement of the user's hand 240 that intersects the trigger line 250, the trigger condition may be satisfied. The autoscroll UI control 114 may respond by scrolling the scrollable region 210. As illustrated in FIG. 2C, the selectable region 220A scrolls toward the bottom border of the scrollable region 210, while selectable region 220B begins scrolling into view from the top border of the scrollable region 210 in one embodiment. As shown in FIG. 2D, selectable content 225B from the previously off-screen selectable region 220B may now be viewed and selected in this manner.

It should be appreciated that the trigger line 250 is illustrated in FIGS. 2A-2D for purposes of explanation only and, in some embodiments, may not be visible on the computer device's 102 display. In other embodiments, an icon or another form of indicator may be used on the computer device's 102 display to guide the user to the trigger line 250. Additionally, FIGS. 2A-2D depict the use of a single trigger line 250. This is done for the purposes of clarity and explanation only. Some embodiments may employ multiple trigger lines 250. For example, and without limitation, a separate trigger line 250 may be utilized for each direction in which the content may be scrolled within the scrollable region 210.

The user experience described above may be affected by the location in which the autoscroll UI control 114 establishes the trigger line 250. In embodiments where the trigger line 250 coincides with the edge of the first selectable region 220A that is directly adjacent to the non-selectable region 230A, or where the trigger line 250 is established within the non-selectable region 230A, satisfying the trigger condition may be interpreted by the autoscroll UI control 114 as a directive to scroll the scrollable region 210. These configurations may be useful in embodiments where the structure of the underlying data 110 provides the user with a natural indication of the beginning and end of the range of content (i.e. alphabetized lists, lists numbered from 1 to 20, etc.). The user may select content from within the first selectable region 220A without the autoscroll UI control 114 scrolling the scrollable region 210. When the user's hand 240 moves to the edge of the first selectable region 220A or beyond, the trigger condition may be satisfied and scrolling may be initiated by the autoscroll UI control 114.

The autoscroll UI control 114 may proactively indicate to the user that additional content may be available. In embodiments where the trigger line 250 is established within the first selectable region 220A near an edge that is directly adjacent to a non-selectable region 230B, the trigger condition may be satisfied without the user's hand 240 moving beyond the boundaries of the first selectable region 220A. Additional details regarding this aspect will be described below with regard to FIGS. 3A-3D.

FIGS. 3A-3D are user interface diagrams showing aspects of autoscroll regions according to various illustrative embodiments. The configurations shown in FIGS. 3A-3D may be useful in embodiments where a user is likely to be unfamiliar with the operation of autoscroll regions, or when the user is unlikely to know how much content is accessible through the autoscroll UI control 114. Examples of when a user may not know how much content is accessible may include when the underlying data 110 is unordered, or when the content as displayed includes large sections of whitespace.

Figure 3A:
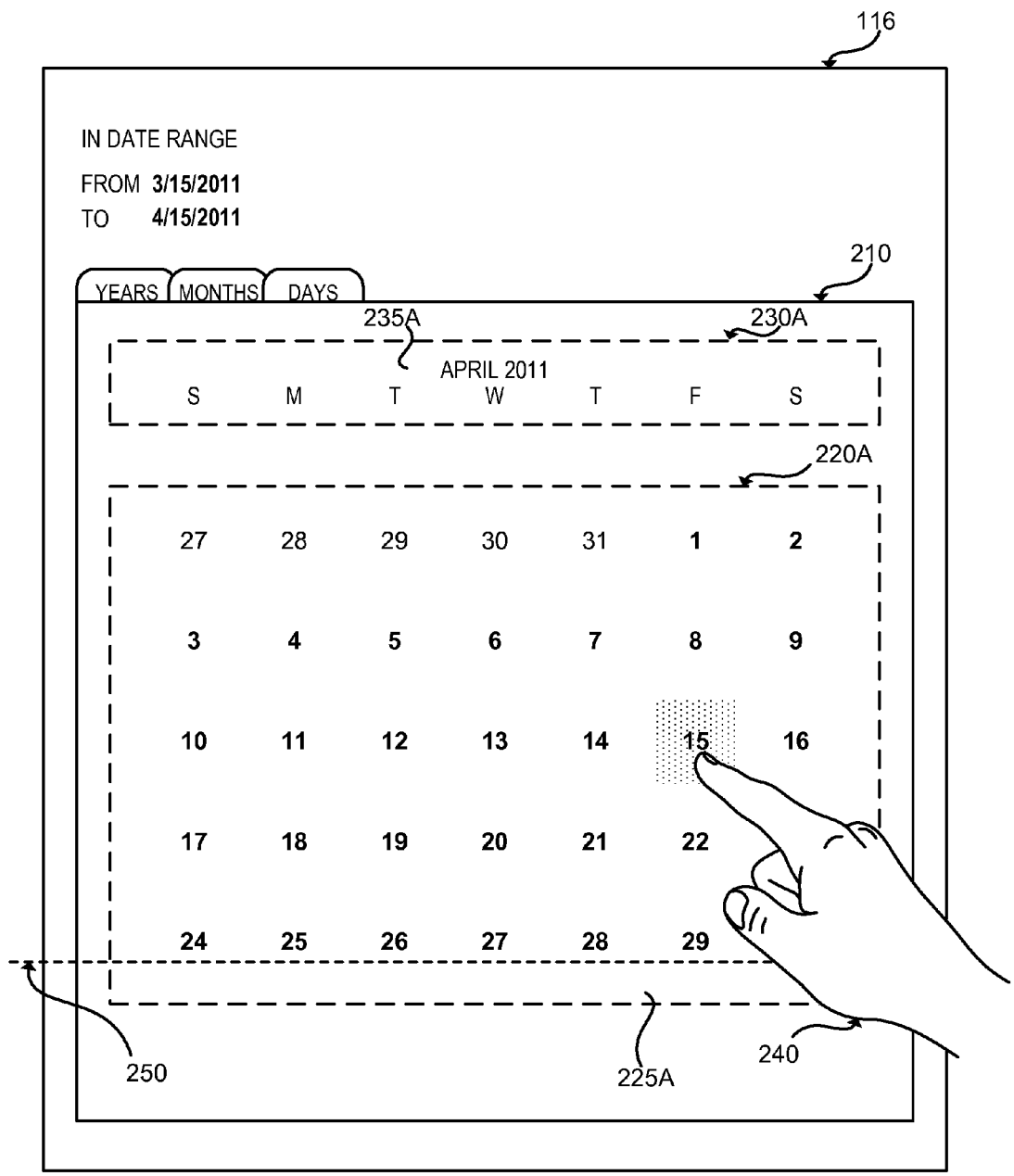
FIGS. 3A-3D are UI diagrams showing aspects of autoscroll regions according to various illustrative embodiments.
Figure 3B:
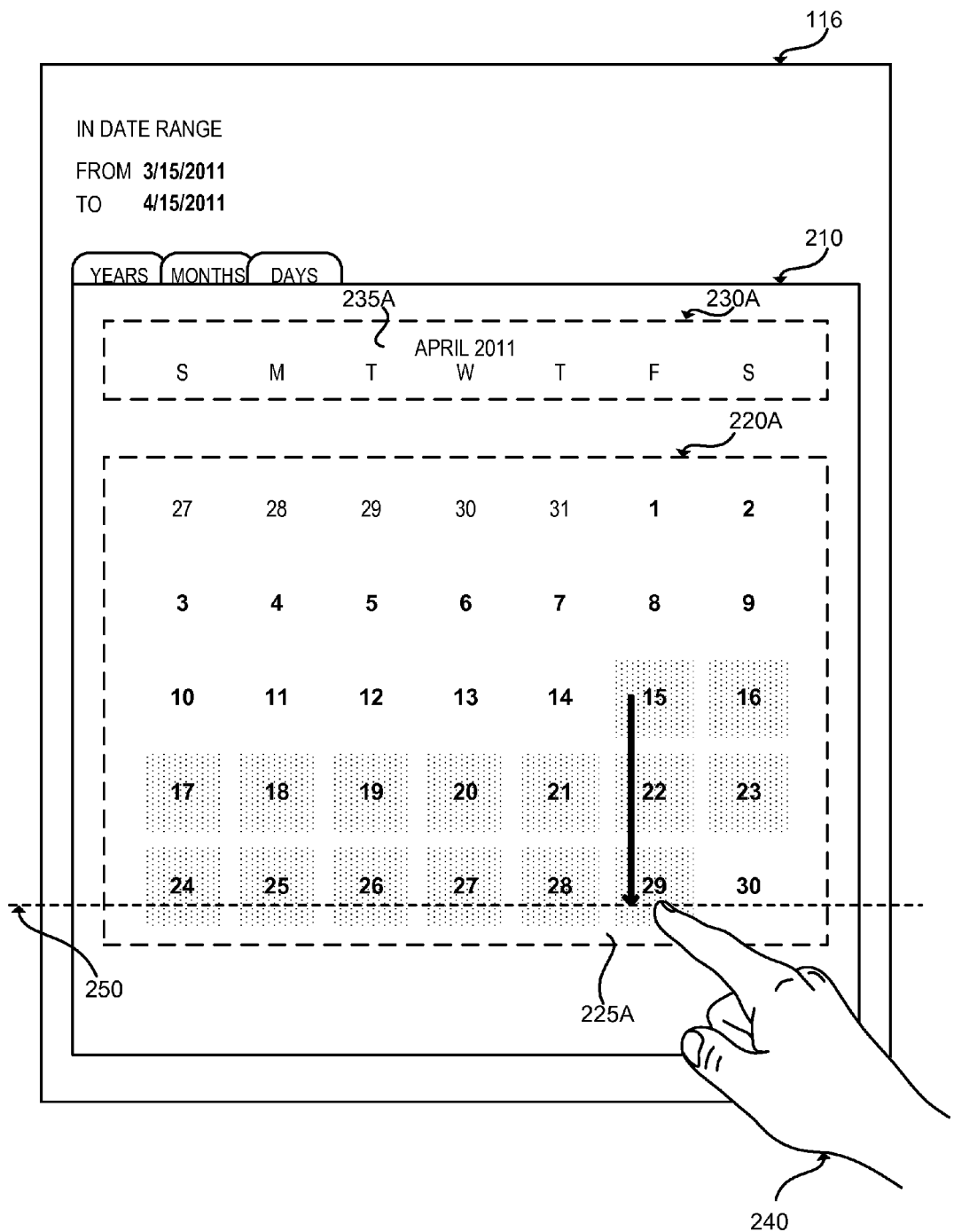
Figure 3C:
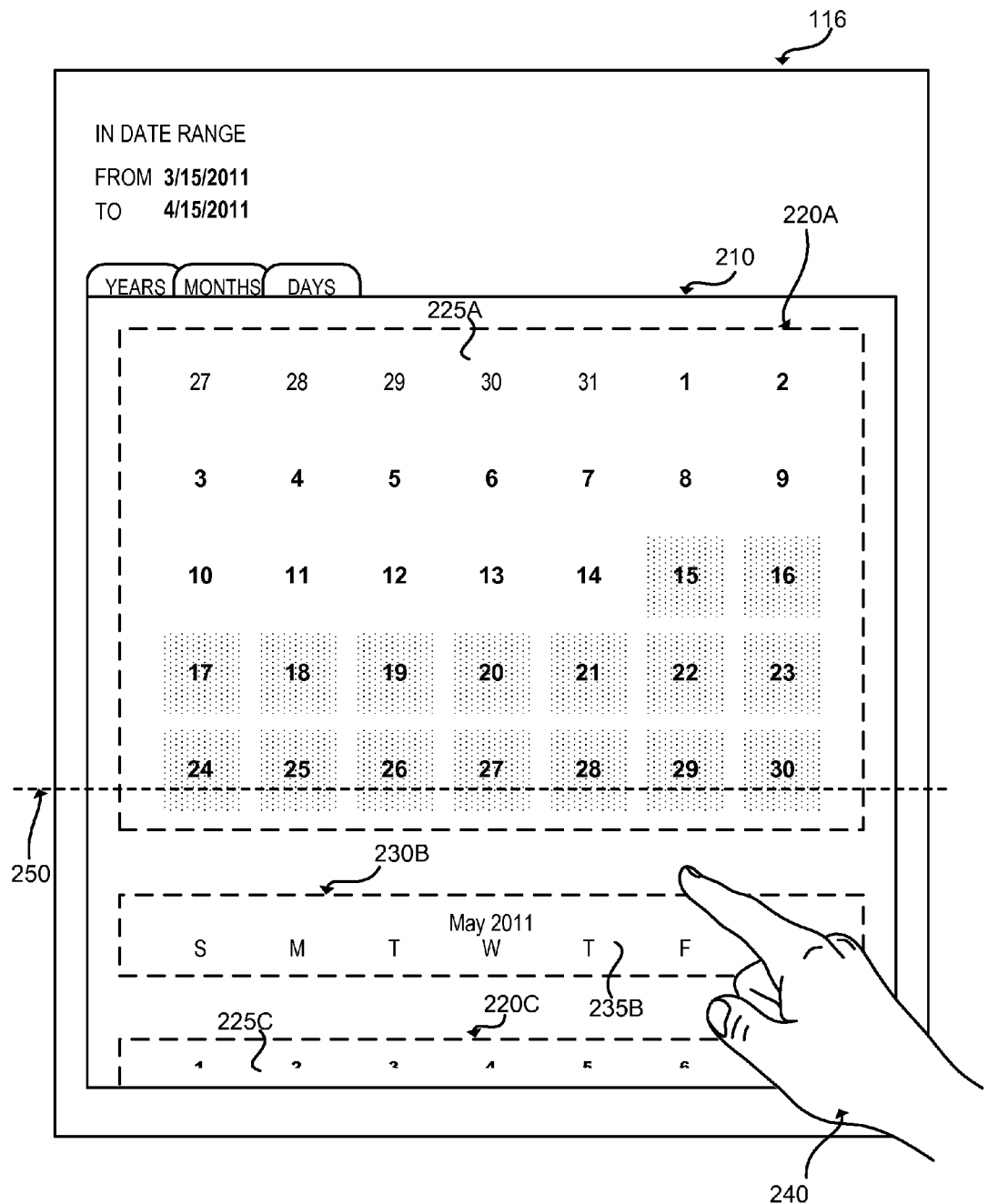
Figure 3D:
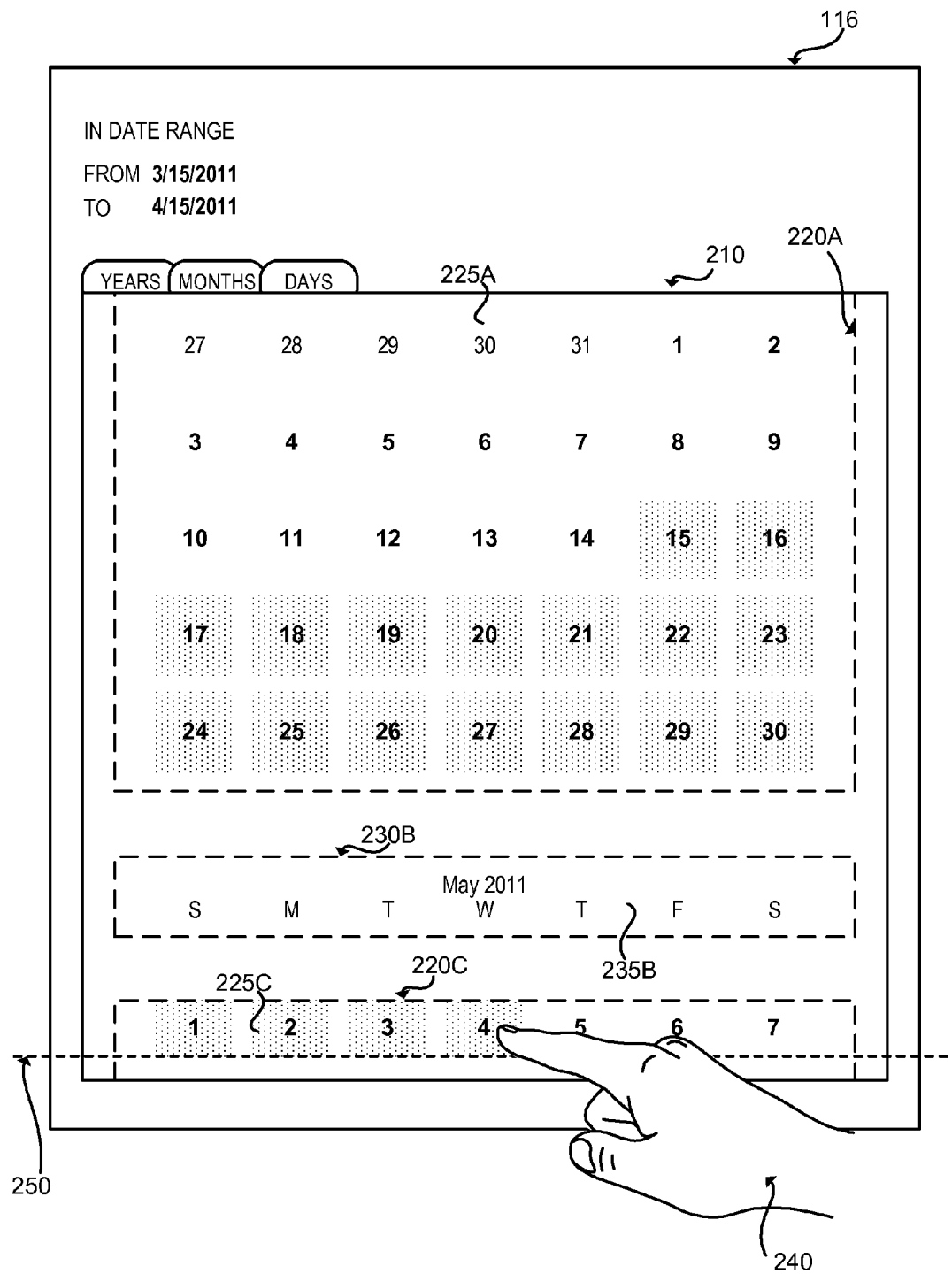

As shown in FIG. 3A, when large sections of whitespace lie between the content displayed in the first selectable region 220A and a boundary of the scrollable region 210, a user may be unaware that additional content is accessible. Under this configuration, if the user's selection includes selectable content 225A near the edge of the first selectable region 220A, the user's hand 240 may intersect the trigger line 250. When the autoscroll UI control 114 detects that the trigger condition has been satisfied, it may respond by scrolling the scrollable region 210 until a threshold amount of another selectable region 220C has scrolled into the scrollable region 210 as illustrated in FIGS. 3B-3D. The threshold amount may include a row, a partial row, or multiple rows of content. The scrolling behavior may be used to proactively signal to the user that more selectable content 225C is available. Additionally, when the autoscroll UI control 114 briefly scrolls the scrollable region 210 in response to detecting the user's hand 240 has intersected the trigger line 250, the user may be provided with a hint as to how to accomplish further scrolling if necessary. For example, the user may realize that by again moving the user's hand 240 so that it intersects the trigger line 250, the scrollable region 210 may be scrolled. The user may then complete the selection from within the first selectable region 220A or may continue the selection into the other selectable region 220C.

In some embodiments, the scrollable region 210 may scroll at a variable rate. The variable rate may be correlated to the position of the user's hand 240 with respect to the scrollable region 210. When the user's hand 240 is within the scrollable region 210, the variable rate may be slower than when the user's hand 240 is outside the scrollable region 210. For instance, in the example calendar UI of FIGS. 2A-2D and FIGS. 3A-3D, the scrollable region 210 might scroll on a row-by-row basis (e.g. one week at a time) when the user's hand 240 is within the scrollable region 210. When the user's hand 240 is outside the scrollable region 210, the scrollable region 210 might scroll on a view-by-view basis (e.g. one month at a time).

In some embodiments, the variable rate may also be correlated to the distance between the user's hand 240 and the scrollable region 210. The variable rate when the user's hand 240 is outside the scrollable region 210 may be slower when the user's hand 240 is nearer to the scrollable region 210 and faster when the user's hand 240 is further away from the scrollable region 210. For instance, in the example calendar UI of FIGS. 2A-2D and FIGS. 3A-3D, the scrollable region 210 might scroll one week at a time when the user's hand 240 is close to, but outside of, the scrollable region 210. In contrast, the scrollable region 210 might scroll one month at a time when the user's hand 240 is further outside the scrollable region 210.

Although the above examples illustrate scrolling in a vertical direction, it should be appreciated that scrolling may also occur in the horizontal or diagonal directions, and may occur in a column-by-column manner, or in various other increments. These examples are illustrative of example embodiments and should not be construed to be limiting in any way.

In some embodiments, if scrolling has started and the user's hand 240 is outside the scrollable region 210, scrolling may continue until the autoscroll UI control 114 detects the user's hand 240 has been lifted. In other embodiments, if the autoscroll UI control 114 determines that a threshold amount of a previously off-screen selectable region, such as 220B or 220C, has scrolled into the scrollable region 210 (as illustrated in FIGS. 2D and 3D) and that the user's hand 240 is within one of the selectable regions 220, the autoscroll UI control 114 may reestablish the trigger line 250 and stop the scrolling of the scrollable region 210. In some embodiments, where only a portion of a selectable region 220C may be visible within the scrollable region 210 (as illustrated in FIG. 3D), the trigger line 250 may be reestablished at or near an edge of the scrollable region 210 that interfaces the selectable region 220C. It should be appreciated that these examples are illustrative of example embodiments and should not be construed to be limiting in any way.

Figure 4:
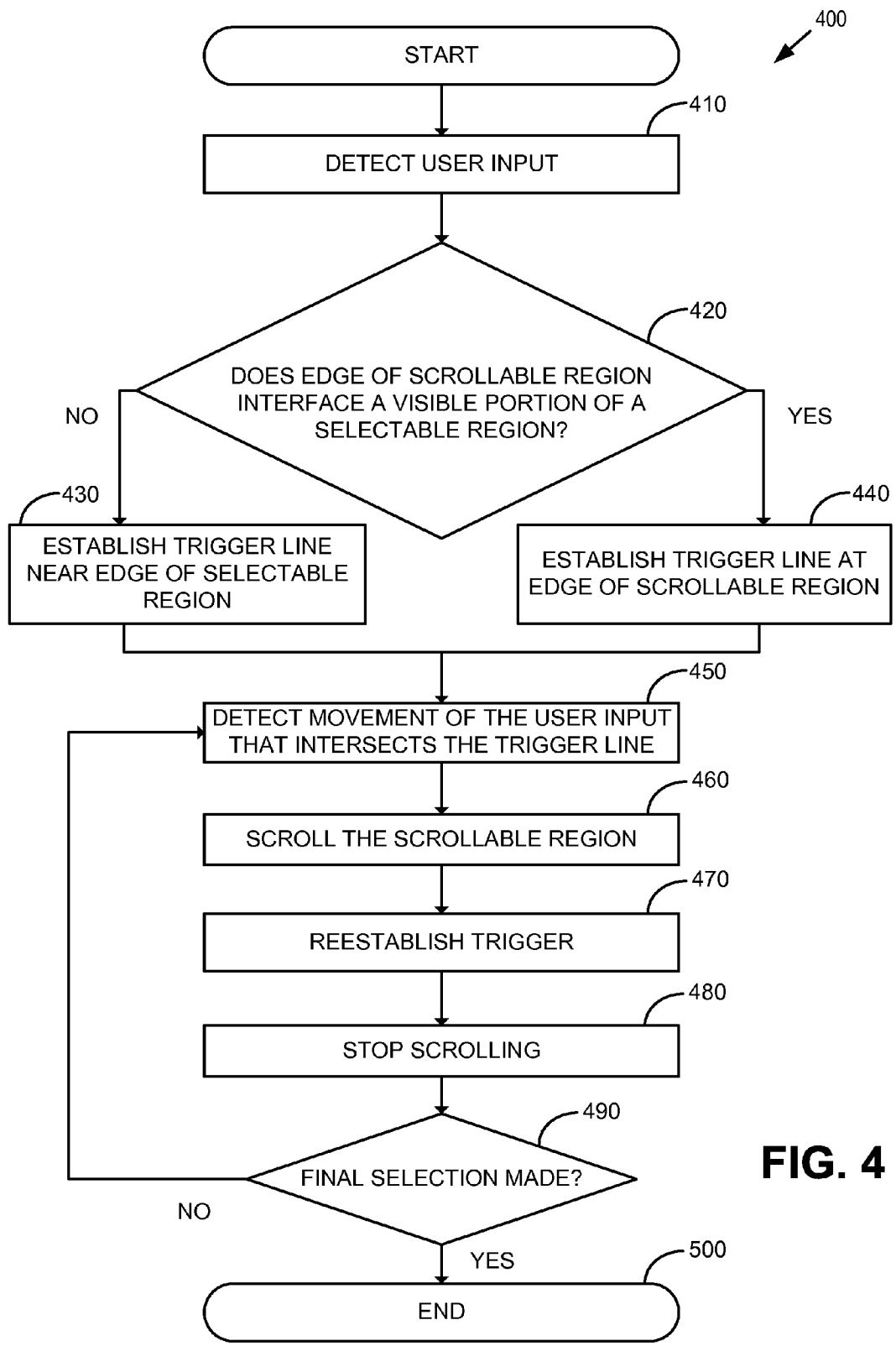
FIG. 4 is a flow diagram showing aspects of a method for scrolling a user interface according to an illustrative embodiment.

Turning now to FIG. 4, aspects of a method 400 for supporting interactions with an autoscroll UI control 114 will be described in detail, according to an illustrative embodiment. It should be understood that the operations of the method 400 disclosed herein are not necessarily presented in any particular order and that performance of some or all of the operations in an alternative order is possible and is contemplated. The operations have been presented in the demonstrated order for ease of description and illustration. Operations may be added, omitted, and/or performed simultaneously, without departing from the scope of the appended claims.

It also should be understood that the illustrated method 400 may be ended at any time and need not be performed in its entirety. Some or all operations of the method 400, and/or substantially equivalent operations, may be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions may be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For purposes of illustrating and describing the concepts of the present disclosure, the method 400 disclosed herein is described as being performed by the device 102 via presentation of the autoscroll UI 116 and/or execution of the application program 108. It should be understood, however, that the autoscroll UI control 114 might also be provided by a web server or other data source 112 and rendered at the device 102 for use by a user. As such, it should be understood that the described embodiments, wherein the autoscroll UI 116 is provided by the application program 108 executing on the device 102, are illustrative and therefore should not be viewed as being limiting in any way.

The method 400 begins at operation 410, where the device 102 may detect the user's hand 240 at an initial selection point within the first selectable region 220. From operation 410 the method 400 proceeds to operation 420, where the device 102 may determine whether an edge of the scrollable region 210 interfaces a visible portion of the first selectable region 220. If so, the method continues to operation 440 where the device 102 may establish the trigger line 250 at the edge of the scrollable region 210. Otherwise, the method goes on to operation 430 where the device 102 may establish the trigger line 250 near an edge of the selectable region 220 that is directly adjacent to a non-selectable region 230.

From operations 430 and 440 the method proceeds to operation 450 where the device 102 may detect movement of the user's hand 240 that intersects the trigger line 250, thus satisfying the trigger condition. The method then continues from operation 450 to operation 460.

At operation 460 the device 102 may scroll the scrollable region 210. As discussed above, the scrollable region 210 might be scrolled at varying rates depending on the position of the user's hand 240 relative to the scrollable region 210. The method proceeds from operation 460 to operation 470 where the trigger line 250 may be reestablished.

From operation 470 the method proceeds to operation 480 where the device 102 may stop the scrolling of the scrollable region 210 after determining a threshold amount of a previously off-screen selectable region 220 has scrolled into the scrollable region 210 and the user's hand 240 is within a selectable region 220. From operation 480, the method continues to operation 490.

At operation 490 the device 102 may determine whether the selection process has been completed. If the device 102 detects the user's hand 240 has been lifted, the content between the initial selection point and the final selection point may be selected and the method may proceed to operation 500 where the method ends. Otherwise, the method returns to operation 450 described above, where the device 102 monitors the user's hand 240 to detect movement of the user's hand 240 that intersects the reestablished trigger line 250.

Figure 5:
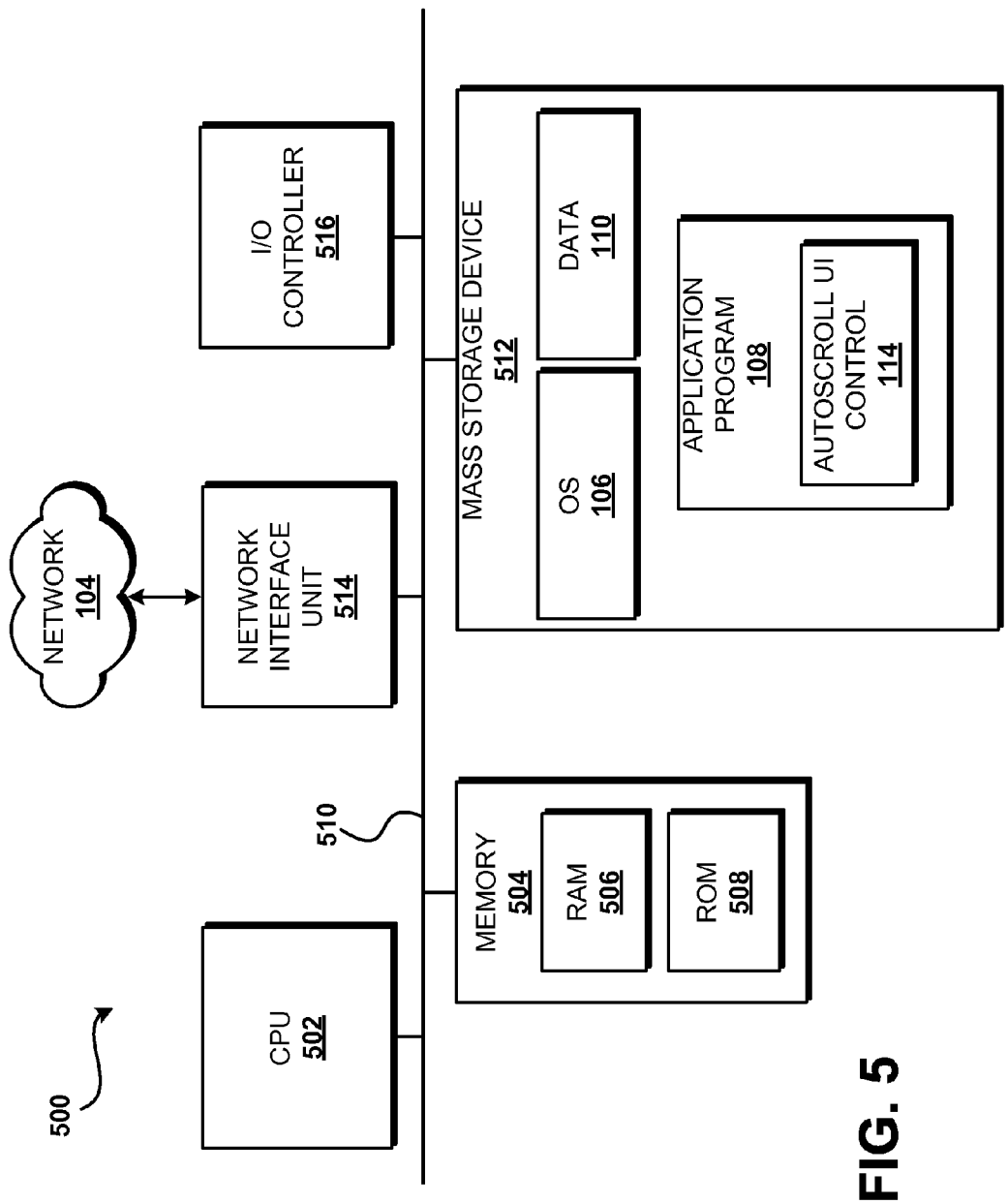
FIG. 5 is a computer architecture diagram showing an illustrative computer hardware and software architecture for a computing system capable of implementing aspects of the embodiments presented herein.

FIG. 5 shows an illustrative computer architecture 500 for a device capable of executing the software components described herein for providing an autoscroll UI control 114. Thus, the computer architecture 500 illustrated in FIG. 5 shows an architecture for a server computer, mobile phone, a PDA, a smart phone, a desktop computer, a netbook computer, a tablet computer, and/or a laptop computer. The computer architecture 500 may be utilized to execute any aspects of the software components presented herein.

The computer architecture 500 illustrated in FIG. 5 includes a central processing unit 502 ("CPU"), a system memory 504, including a random access memory 506 ("RAM") and a read-only memory ("ROM") 508, and a system bus 510 that couples the memory 504 to the CPU 502. A basic input/output system containing the basic routines that help to transfer information between elements within the computer architecture 500, such as during startup, is stored in the ROM 508. The computer architecture 500 further includes a mass storage device 512 for storing the operating system 106 and the application program 108. The mass storage device 512 also may be configured to store the data 110 and the autoscroll UI control 114, if desired.

The mass storage device 512 is connected to the CPU 502 through a mass storage controller (not shown) connected to the system bus 510. The mass storage device 512 and its associated computer-readable media provide non-volatile storage for the computer architecture 500. Although the description of computer-readable media contained herein refers to a mass storage device, such as a hard disk or CD-ROM drive, it should be appreciated by those skilled in the art that computer-readable media may be any available computer storage media or communication media that may be accessed by the computer architecture 500.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which may be used to store the desired information and which may be accessed by the computer architecture 500. For purposes of the claims, the phrase "computer storage medium" and variations thereof, does not include waves, signals, and/or other transitory and/or intangible communication media, per se.

According to various embodiments, the computer architecture 500 may operate in a networked environment using logical connections to remote computers through a network 104. The computer architecture 500 may connect to the network 104 through a network interface unit 514 connected to the system bus 510. It should be appreciated that the network interface unit 514 also may be utilized to connect to other types of networks and remote computer systems, for example, the data source 112. The computer architecture 500 also may include an input/output controller 516 for receiving and processing input from a number of other devices, including a keyboard, mouse, or electronic stylus (not shown in FIG. 5). Similarly, the input/output controller 516 may provide output to a display screen, a printer, or other type of output device (also not shown in FIG. 5).

It should be appreciated that the software components described herein may, when loaded into the CPU 502 and executed, transform the CPU 502 and the overall computer architecture 500 from a general-purpose computing system into a special-purpose computing system customized to facilitate the functionality presented herein. The CPU 502 may be constructed from any number of transistors or other discrete circuit elements, which may individually or collectively assume any number of states. More specifically, the CPU 502 may operate as a finite-state machine, in response to executable instructions contained within the software modules disclosed herein. These computer-executable instructions may transform the CPU 502 by specifying how the CPU 502 transitions between states, thereby transforming the transistors or other discrete hardware elements constituting the CPU 502.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 500 in order to store and execute the software components presented herein. It also should be appreciated that the computer architecture 500 may include other types of devices 102, including hand-held computers, embedded computer systems, personal digital assistants, and other types of computing systems known to those skilled in the art. It is also contemplated that the computer architecture 500 may not include all of the components shown in FIG. 5, may include other components that are not explicitly shown in FIG. 5, or may utilize an architecture completely different than that shown in FIG. 5.

Figure 6:
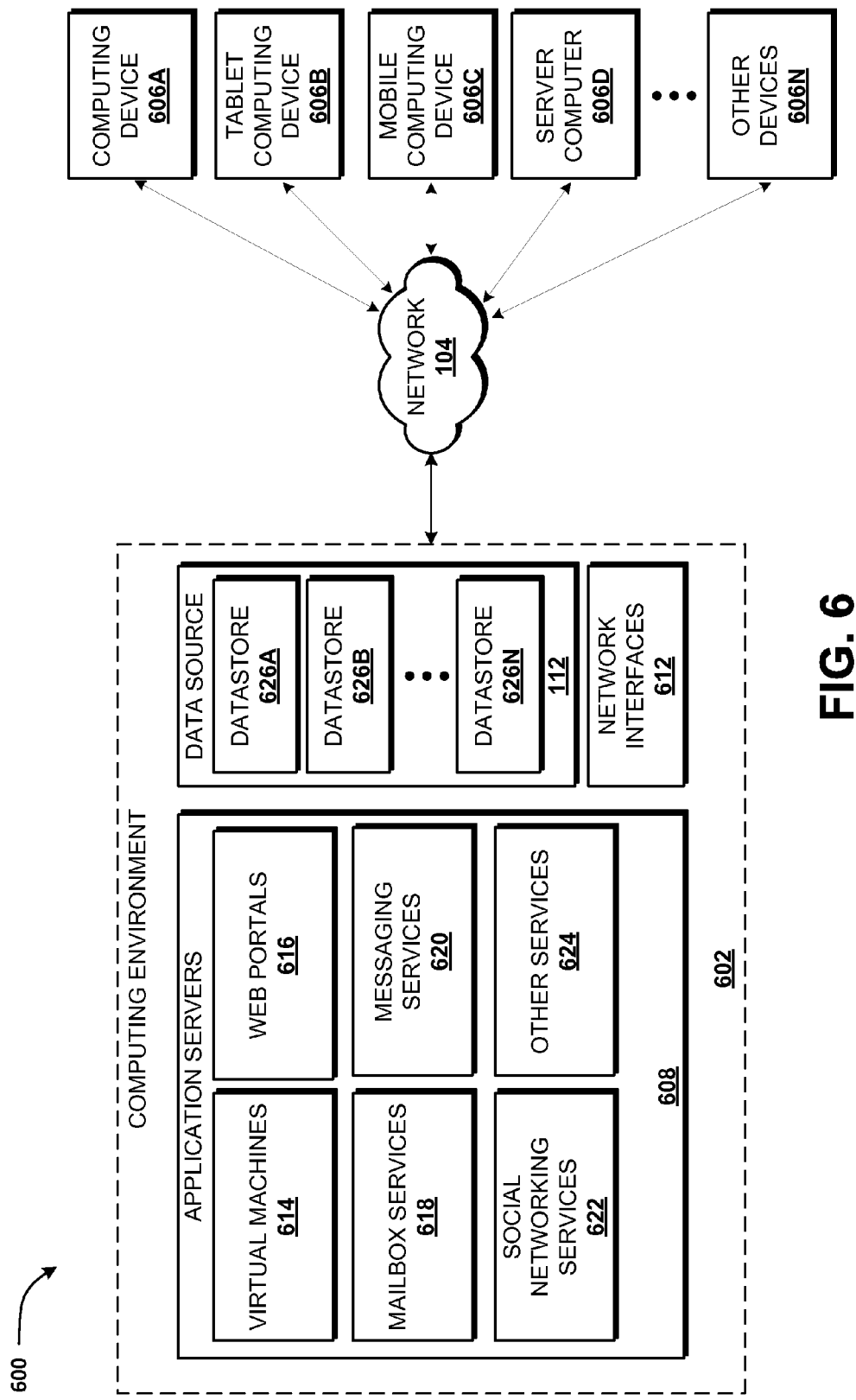
FIG. 6 is a system and network diagram illustrating a distributed computing environment capable of implementing aspects of the embodiments presented herein.

FIG. 6 is a system and network diagram illustrating a distributed computing environment 600 capable of implementing aspects of the embodiments presented herein. According to various implementations, the distributed computing environment 600 includes a computing environment 602 operating on, in communication with, or as part of the network 104. The network 104 also might include various access networks. One or more client devices 606A-606N (hereinafter referred to collectively and/or generically as "clients 606") may communicate with the computing environment 602 via the network 104 and/or other connections (not illustrated in FIG. 6). In the illustrated embodiment, the clients 606 include a computing device 606A such as a laptop computer, a desktop computer, or other computing device; a slate or tablet computing device ("tablet computing device") 606B; a mobile computing device 606C such as a mobile telephone, a smart phone, or other mobile computing device; a server computer 606D; and/or other devices 606N. It should be understood that any number of clients 606 might communicate with the computing environment 602. Two example computing architectures for the clients 606 are illustrated and described herein with reference to FIGS. 5 and 7. It should be understood that the illustrated clients 606 and computing architectures illustrated and described herein are illustrative, and should not be construed as being limiting in any way.

In the illustrated embodiment, the computing environment 602 includes application servers 608, data source 112, and one or more network interfaces 612. According to various implementations, the functionality of the application servers 608 may be provided by one or more server computers 606D that are executing as part of, or in communication with, the network 104. The application servers 608 may host various services, virtual machines, portals, and/or other resources. In the illustrated embodiment, the application servers 608 host one or more virtual machines 614 for hosting applications or other functionality. According to various implementations, the virtual machines 614 host one or more applications and/or software modules for providing the functionality described herein for supporting interactions with dial-based user interfaces. It should be understood that this embodiment is illustrative, and should not be construed as being limiting in any way. The application servers 608 also host or provide access to one or more Web portals, link pages, Web sites, and/or other information ("Web portals") 616.

According to various implementations, the application servers 608 also include one or more mailbox services 618 and one or more messaging services 620. The mailbox services 618 may include electronic mail ("email") services. The mailbox services 618 also might include various personal information management ("PIM") services including, but not limited to, calendar services, contact management services, collaboration services, and/or other services. The messaging services 620 may include, but are not limited to, instant messaging services, chat services, forum services, and/or other communication services.

As shown in FIG. 6, the application servers 608 also may host other services, applications, portals, and/or other resources ("other resources") 624. It thus may be appreciated that the computing environment 602 may provide integration of the concepts and technologies provided herein for supporting interactions with autoscroll regions with various mailbox, messaging, social networking 622, and/or other services or resources. For example, the concepts and technologies disclosed herein may provide autoscroll regions for interacting with social networking services 622, mail services, messaging services, and/or other services or applications.

As mentioned above, the computing environment 602 may include the data source 112. According to various implementations, the functionality of the data source 112 is provided by one or more databases operating on, or in communication with, the network 104. The functionality of the data source 112 also might be provided by one or more server computers configured to host data for the computing environment 602. The data source 112 might include, host, or provide one or more real or virtual datastores 626A-626N (hereinafter referred to collectively and/or generically as "datastores 626"). The datastores 626 are configured to host data used or created by the application servers 608 and/or other data. Although not illustrated in FIG. 6, the datastores 626 also may host or store the data 110 shown in FIGS. 1 and 5, if desired.

The computing environment 602 may communicate with, or be accessed by, the network interfaces 612. The network interfaces 612 might include various types of network hardware and software for supporting communications between two or more computing devices including, but not limited to, the clients 606 and the application servers 608. It should be appreciated that the network interfaces 612 also may be utilized to connect to other types of networks and/or computer systems.

It should be understood that the distributed computing environment 600 described herein may provide any aspects of the software elements described herein with any number of virtual computing resources and/or other distributed computing functionality that may be configured to execute any aspects of the software components disclosed herein. According to various implementations of the concepts and technologies disclosed herein, the distributed computing environment 600 provides the software functionality described herein as a service to the clients 606. It should be understood that the clients 606 may include real or virtual machines including, but not limited to, server computers, web servers, personal computers, mobile computing devices, smart phones, and/or other devices. As such, various embodiments of the concepts and technologies disclosed herein enable any device configured to access the distributed computing environment 600 to utilize the functionality described herein for dial-based user interfaces.

Figure 7:
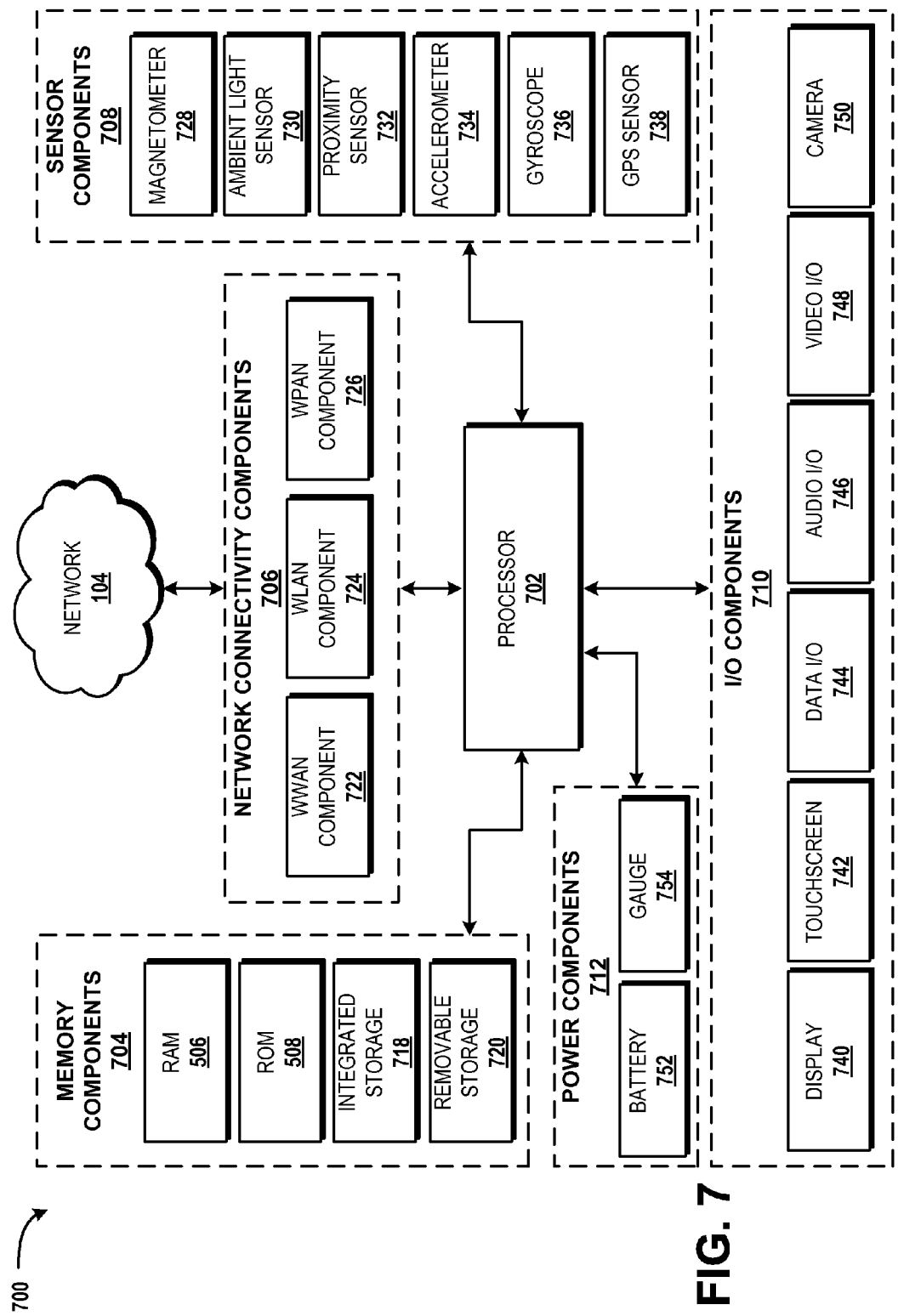
FIG. 7 is a computer architecture diagram illustrating a computing device architecture capable of implementing aspects of the embodiments presented herein.

FIG. 7 is a computer architecture diagram illustrating a computing device architecture 700 capable of implementing aspects of the embodiments presented herein. The computing device architecture 700 illustrated in FIG. 7 includes a processor 702, memory components 704, network connectivity components 706, sensor components 708, input/output components 710, and power components 712. In the illustrated embodiment, the processor 702 is in communication with the memory components 704, the network connectivity components 706, the sensor components 708, the input/output ("I/O") components 710, and the power components 712. Although no connections are shown between the individuals components illustrated in FIG. 7, the components may interact to carry out device functions. In some embodiments, the components are arranged so as to communicate via one or more system busses (not shown).

The processor 702 includes a CPU 502 configured to process data 110, execute computer-executable instructions of one or more application programs 108, and communicate with other components of the computing device architecture 700 in order to perform various functionality described herein. The processor 702 may be utilized to execute aspects of the software components presented herein and, particularly, those that utilize, at least in part, a touch-enabled input.

In some embodiments, the processor 702 includes a graphics processing unit ("GPU", not shown) configured to accelerate operations performed by the CPU 502, including, but not limited to, operations performed by executing general-purpose scientific and engineering computing applications, as well as graphics-intensive computing applications such as high resolution video (e.g., 720P, 1080P, and greater), video games, three-dimensional ("3D") modeling applications, and the like. In some embodiments, the processor 702 is configured to communicate with a discrete GPU. In any case, the CPU 502 and GPU may be configured in accordance with a co-processing CPU/GPU computing model, wherein the sequential part of an application executes on the CPU 502 and the computationally-intensive part is accelerated by the GPU.

In some embodiments, the processor 702 is, or is included in, a system-on-chip ("SoC") along with one or more of the other components described herein below. For example, the SoC may include the processor 702, a GPU, one or more of the network connectivity components 706, and one or more of the sensor components 708. In some embodiments, the processor 702 is fabricated, in part, utilizing a package-on-package ("PoP") integrated circuit packaging technique. Moreover, the processor 702 may be a single core or multi-core processor.

The processor 702 may be created in accordance with an ARM architecture, available for license from ARM HOLDINGS of Cambridge, United Kingdom. Alternatively, the processor 702 may be created in accordance with an x86 architecture, such as is available from INTEL CORPORATION® of Mountain View, Calif. and others. In some embodiments, the processor 702 is a SNAPDRAGON® SoC, available from QUALCOMM® of San Diego, Calif., a TEGRA® SoC, available from NVIDIA® of Santa Clara, Calif., a HUMMINGBIRD® SoC, available from SAMSUNG® of Seoul, South Korea, an Open Multimedia Application Platform ("OMAP™") SoC, available from TEXAS INSTRUMENTS® of Dallas, Tex., a customized version of any of the above SoCs, or a proprietary SoC.

The memory components 704 include a RAM 506, a ROM 508, an integrated storage memory ("integrated storage") 718, and a removable storage memory ("removable storage") 720. In some embodiments, the RAM 506 or a portion thereof, the ROM 508 or a portion thereof, and/or some combination the RAM 506 and the ROM 508 is integrated in the processor 702. In some embodiments, the ROM 508 is configured to store a firmware, an operating system or a portion thereof (e.g., operating system kernel), and/or a bootloader to load an operating system kernel from the integrated storage 718 or the removable storage 720.

The integrated storage 718 may include a solid-state memory, a hard disk, or a combination of solid-state memory and a hard disk. The integrated storage 718 may be soldered or otherwise connected to a logic board upon which the processor 702 and other components described herein also may be connected. As such, the integrated storage 718 is integrated in the computing device. The integrated storage 718 is configured to store an operating system or portions thereof, application programs, data, and other software components described herein.

The removable storage 720 may include a solid-state memory, a hard disk, or a combination of solid-state memory and a hard disk. In some embodiments, the removable storage 720 is provided in lieu of the integrated storage 718. In other embodiments, the removable storage 720 is provided as additional optional storage. In some embodiments, the removable storage 720 is logically combined with the integrated storage 718 such that the total available storage is made available and shown to a user as a total combined capacity of the integrated storage 718 and the removable storage 720.

The removable storage 720 is configured to be inserted into a removable storage memory slot (not shown) or other mechanism by which the removable storage 720 is inserted and secured to facilitate a connection over which the removable storage 720 may communicate with other components of the computing device, such as the processor 702. The removable storage 720 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It may be understood that one or more of the memory components 704 may store an operating system. According to various embodiments, the operating system includes, but is not limited to, SYMBIAN OS from SYMBIAN LIMITED, WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 706 include a wireless wide area network component ("WWAN component") 722, a wireless local area network component ("WLAN component") 724, and a wireless personal area network component ("WPAN component") 727. The network connectivity components 706 facilitate communications to and from a network 104, which may be a WWAN, a WLAN, or a WPAN. Although a single network 104 is illustrated, the network connectivity components 706 may facilitate simultaneous communication with multiple networks. For example, the network connectivity components 706 may facilitate simultaneous communications with multiple networks via one or more of a WWAN, a WLAN, or a WPAN.

The network 104 may be a WWAN 722, such as a mobile telecommunications network utilizing one or more mobile telecommunications technologies to provide voice and/or data services to a computing device utilizing the computing device architecture 700 via the WWAN component 722. The mobile telecommunications technologies may include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX"). Moreover, the network 104 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 104 may be configured to provide voice and/or data communications with any combination of the above technologies. The network 104 may be configured to or adapted to provide voice and/or data communications in accordance with future generation technologies.

In some embodiments, the WWAN component 722 is configured to provide dual-multi-mode connectivity to the network 104. For example, the WWAN component 722 may be configured to provide connectivity to the network 104, wherein the network 104 provides service via GSM and UMTS technologies, or via some other combination of technologies. Alternatively, multiple WWAN components 722 may be utilized to perform such functionality, and/or provide additional functionality to support other non-compatible technologies (i.e., incapable of being supported by a single WWAN component). The WWAN component 722 may facilitate similar connectivity to multiple networks (e.g., a UMTS network and an LTE network).

The network 104 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some embodiments, the WLAN is implemented utilizing one or more wireless WI-FI access points. In some embodiments, one or more of the wireless WI-FI access points are another computing device with connectivity to a WWAN functioning as a WI-FI hotspot. The WLAN component 724 is configured to connect to the network 104 via the WI-FI access points. Such connections may be secured via various encryption technologies including, but not limited, WI-FI Protected Access ("WPA"), WPA2, Wired Equivalent Privacy ("WEP"), and the like.

The network 104 may be a WPAN operating in accordance with Infrared Data Association ("IrDA"), BLUETOOTH, wireless Universal Serial Bus ("USB"), Z-Wave, ZIGBEE, or some other short-range wireless technology. In some embodiments, the WPAN component 726 is configured to facilitate communications with other devices, such as peripherals, computers, or other computing devices via the WPAN.

The sensor components 708 include a magnetometer 728, an ambient light sensor 730, a proximity sensor 732, an accelerometer 734, a gyroscope 736, and a Global Positioning System sensor ("GPS sensor") 738. It is contemplated that other sensors, such as, but not limited to, temperature sensors or shock detection sensors, also may be incorporated in the computing device architecture 700.

The magnetometer 728 is configured to measure the strength and direction of a magnetic field. In some embodiments the magnetometer 728 provides measurements to a compass application program stored within one of the memory components 704 in order to provide a user with accurate directions in a frame of reference including the cardinal directions, north, south, east, and west. Similar measurements may be provided to a navigation application program that includes a compass component. Other uses of measurements obtained by the magnetometer 728 are contemplated.

The ambient light sensor 730 is configured to measure ambient light. In some embodiments, the ambient light sensor 730 provides measurements to an application program stored within one the memory components 704 in order to automatically adjust the brightness of a display (described below) to compensate for low-light and high-light environments. Other uses of measurements obtained by the ambient light sensor 730 are contemplated.

The proximity sensor 732 is configured to detect the presence of an object or thing in proximity to the computing device without direct contact. In some embodiments, the proximity sensor 732 detects the presence of a user's body (e.g., the user's face) and provides this information to an application program stored within one of the memory components 704 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 732 are contemplated.

The accelerometer 734 is configured to measure proper acceleration. In some embodiments, output from the accelerometer 734 is used by an application program as an input mechanism to control some functionality of the application program. For example, the application program may be a video game in which a character, a portion thereof, or an object is moved or otherwise manipulated in response to input received via the accelerometer 734. In some embodiments, output from the accelerometer 734 is provided to an application program for use in switching between landscape and portrait modes, calculating coordinate acceleration, or detecting a fall. Other uses of the accelerometer 734 are contemplated.

The gyroscope 736 is configured to measure and maintain orientation. In some embodiments, output from the gyroscope 736 is used by an application program as an input mechanism to control some functionality of the application program. For example, the gyroscope 736 may be used for accurate recognition of movement within a 3D environment of a video game application or some other application. In some embodiments, an application program utilizes output from the gyroscope 736 and the accelerometer 734 to enhance control of some functionality of the application program. Other uses of the gyroscope 736 are contemplated.

The GPS sensor 738 is configured to receive signals from GPS satellites for use in calculating a location. The location calculated by the GPS sensor 738 may be used by any application program that requires or benefits from location information. For example, the location calculated by the GPS sensor 738 may be used with a navigation application program to provide directions from the location to a destination or directions from the destination to the location. Moreover, the GPS sensor 738 may be used to provide location information to an external location-based service, such as E911 service. The GPS sensor 738 may obtain location information generated via WI-FI, WIMAX, and/or cellular triangulation techniques utilizing one or more of the network connectivity components 706 to aid the GPS sensor 738 in obtaining a location fix. The GPS sensor 738 may also be used in Assisted GPS ("A-GPS") systems.

The I/O components 710 include a display 740, a touchscreen 742, a data I/O interface component ("data I/O") 744, an audio I/O interface component ("audio I/O") 746, a video I/O interface component ("video I/O") 748, and a camera 750. In some embodiments, the display 740 and the touchscreen 742 are combined. In some embodiments two or more of the data I/O component 744, the audio I/O component 746, and the video I/O component 748 are combined. The I/O components 710 may include discrete processors configured to support the various interfaces described below, or may include processing functionality built-in to the processor 702.

The display 740 is an output device configured to present information in a visual form. In particular, the display 740 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some embodiments, the display 740 is a liquid crystal display ("LCD") utilizing any active or passive matrix technology and any backlighting technology (if used). In some embodiments, the display 740 is an organic light emitting diode ("OLED") display. Other display types are contemplated.

The touchscreen 742 is an input device configured to detect the presence and location of a touch. The touchscreen 742 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some embodiments, the touchscreen 742 is incorporated on top of the display 740 as a transparent layer to enable a user to use one or more touches to interact with objects or other information presented on the display 740. In other embodiments, the touchscreen 742 is a touch pad incorporated on a surface of the computing device that does not include the display 740. For example, the computing device may have a touchscreen incorporated on top of the display 740 and a touch pad on a surface opposite the display 740.

In some embodiments, the touchscreen 742 is a single-touch touchscreen. In other embodiments, the touchscreen 742 is a multi-touch touchscreen. In some embodiments, the touchscreen 742 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 742. As such, a developer may create gestures that are specific to a particular application program.

In some embodiments, the touchscreen 742 supports a tap gesture in which a user taps the touchscreen 742 once on an item presented on the display 740. The tap gesture may be used for various reasons including, but not limited to, opening or launching whatever the user taps. In some embodiments, the touchscreen 742 supports a double tap gesture in which a user taps the touchscreen 742 twice on an item presented on the display 740. The double tap gesture may be used for various reasons including, but not limited to, zooming in or zooming out in stages. In some embodiments, the touchscreen 742 supports a tap and hold gesture in which a user taps the touchscreen 742 and maintains contact for at least a predefined time. The tap and hold gesture may be used for various reasons including, but not limited to, opening a context-specific menu.

In some embodiments, the touchscreen 742 supports a pan gesture in which a user places a finger on the touchscreen 742 and maintains contact with the touchscreen 742 while moving the finger on the touchscreen 742. The pan gesture may be used for various reasons including, but not limited to, moving through screens, images, or menus at a controlled rate. Multiple finger pan gestures are also contemplated. In some embodiments, the touchscreen 742 supports a flick gesture in which a user swipes a finger in the direction the user wants the screen to move. The flick gesture may be used for various reasons including, but not limited to, scrolling horizontally or vertically through menus or pages. In some embodiments, the touchscreen 742 supports a pinch and stretch gesture in which a user makes a pinching motion with two fingers (e.g., thumb and forefinger) on the touchscreen 742 or moves the two fingers apart. The pinch and stretch gesture may be used for various reasons including, but not limited to, zooming gradually in or out of a website, map, or picture.

Although the above gestures have been described with reference to the use of one or more fingers for performing the gestures, other appendages such as toes or objects such as styluses may be used to interact with the touchscreen 742. As such, the above gestures should be understood as being illustrative and should not be construed as being limiting in any way. In addition, it should be noted that the gestures described above with reference to FIGS. 1-4 also may be supported by the touchscreen 742.

The data I/O interface component 744 is configured to facilitate input of data to the computing device and output of data from the computing device. In some embodiments, the data I/O interface component 744 includes a connector configured to provide wired connectivity between the computing device and a computer system, for example, for synchronization operation purposes. The connector may be a proprietary connector or a standardized connector such as USB, micro-USB, mini-USB, or the like. In some embodiments, the connector is a dock connector for docking the computing device with another device such as a docking station, audio device (e.g., a digital music player), or video device.

The audio I/O interface component 746 is configured to provide audio input and/or output capabilities to the computing device. In some embodiments, the audio I/O interface component 746 includes a microphone configured to collect audio signals. In some embodiments, the audio I/O interface component 746 includes a headphone jack configured to provide connectivity for headphones or other external speakers. In some embodiments, the audio interface component 746 includes a speaker for the output of audio signals. In some embodiments, the audio I/O interface component 746 includes an optical audio cable out.

The video I/O interface component 748 is configured to provide video input and/or output capabilities to the computing device. In some embodiments, the video I/O interface component 748 includes a video connector configured to receive video as input from another device (e.g., a video media player such as a DVD or BLURAY player) or send video as output to another device (e.g., a monitor, a television, or some other external display). In some embodiments, the video I/O interface component 748 includes a High-Definition Multimedia Interface ("HDMI"), mini-HDMI, micro-HDMI, DisplayPort, or proprietary connector to input/output video content. In some embodiments, the video I/O interface component 748 or portions thereof are combined with the audio I/O interface component 746 or portions thereof.

The camera 750 may be configured to capture still images and/or video. The camera 750 may utilize a charge coupled device ("CCD") or a complementary metal oxide semiconductor ("CMOS") image sensor to capture images. In some embodiments, the camera 750 includes a flash to aid in taking pictures in low-light environments. Settings for the camera 750 may be implemented as hardware or software buttons.

Although not illustrated, one or more hardware buttons may also be included in the computing device architecture 700. The hardware buttons may be used for controlling some operational aspect of the computing device. The hardware buttons may be dedicated buttons or multi-use buttons. The hardware buttons may be mechanical or sensor-based.

The illustrated power components 712 include one or more batteries 752, which may be connected to a battery gauge 754. The batteries 752 may be rechargeable or disposable. Rechargeable battery types include, but are not limited to, lithium polymer, lithium ion, nickel cadmium, and nickel metal hydride. Each of the batteries 752 may be made of one or more cells.

The battery gauge 754 may be configured to measure battery parameters such as current, voltage, and temperature. In some embodiments, the battery gauge 754 is configured to measure the effect of a battery's discharge rate, temperature, age and other factors to predict remaining life within a certain percentage of error. In some embodiments, the battery gauge 754 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 712 may also include a power connector, which may be combined with one or more of the aforementioned I/O components 710. The power components 712 may interface with an external power system or charging equipment via a power I/O component (not shown).

Based on the foregoing, it should be appreciated that technologies for providing autoscroll regions have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method comprising:
presenting a user interface comprising a scrollable region having one or more selectable regions and one or more non-selectable regions, a first selectable region of the one or more selectable regions being adjacent to a first non-selectable region of the one or more non-selectable regions;
detecting a user input within the first selectable region;
determining whether a first edge of the scrollable region interfaces a visible portion of the first selectable region;
based at least partly on a first determination that the first edge of the scrollable region interfaces the visible portion of the first selectable region, establishing a trigger line at the first edge of the scrollable region;
based at least partly on a second determination that the first edge of the scrollable region does not interface the visible portion of the first selectable region, establishing a trigger line near a second edge of the first selectable region, the second edge being directly adjacent to the first non-selectable region;
detecting movement of the user input that intersects the trigger line;
scrolling the scrollable region based at least partly on the movement of the user input; and
reestablishing the trigger line at a third edge of the scrollable region that interfaces a second selectable region of the one or more selectable regions.

2. The method of claim 1, further comprising:
determining that the user input is within the scrollable region and that a threshold amount of the second selectable region of the one or more selectable regions has scrolled into the scrollable region; and
stopping the scrolling of the scrollable region based at least partly on a determination that the user input is within the scrollable region and that the threshold amount of the second selectable region of the one or more selectable regions has scrolled into the scrollable region.

3. The method of claim 1, wherein establishing the trigger line near the second edge of the first selectable region further comprises establishing the trigger line so that the trigger line coincides with the second edge of the first selectable region.

4. The method of claim 1, wherein establishing the trigger line near the second edge of the first selectable region further comprises establishing the trigger line so that the trigger line is within a portion of the first selectable region nearest to the second edge of the first selectable region.

5. The method of claim 1, wherein establishing the trigger line near the second edge of the first selectable region further comprises establishing the trigger line so that the trigger line is within a portion of the first non-selectable region nearest to the second edge of the first selectable region.

6. The method of claim 1, wherein the scrollable region further comprises one or more horizontal rows of content, and wherein scrolling the scrollable region comprises scrolling one horizontal row of content of the one or more horizontal rows of content at a time.

7. The method of claim 1, wherein the scrollable region further comprises one or more vertical columns of content, and wherein scrolling the scrollable region comprises scrolling one vertical column of content of the one or more vertical columns of content at a time.

8. The method of claim 1, wherein scrolling the scrollable region comprises scrolling the scrollable region at a variable rate that is slower at a first time at which the user input is within the scrollable region than at a second time at which the user input is outside the scrollable region.

9. The method of claim 1, wherein detecting the user input within the first selectable region further comprises detecting the user input at an initial selection point within the first selectable region.

10. The method of claim 9, further comprising determining a final selection point of the user input.

11. The method of claim 10, further comprising selecting content between and including the initial selection point and the final selection point.

12. An apparatus comprising:
a processor; and
a computer readable memory having computer-executable instructions stored thereupon which, when executed by a computer, cause the computer to:
present a user interface on a display, wherein the user interface comprises a scrollable region having one or more selectable regions and one or more non-selectable regions, wherein a first selectable region of the one or more selectable regions lies adjacent to a first non-selectable region of the one or more non-selectable regions;
detect user input within the first selectable region of the one or more selectable regions;
determine whether a first edge of the scrollable region interfaces a visible portion of the first selectable region;
based at least partly on a first determination that the first edge of the scrollable region interfaces the visible portion of the first selectable region, establish a trigger line at the first edge of the scrollable region;
based at least partly on a second determination that the first edge of the scrollable region does not interface the visible portion of the first selectable region, establish the trigger line near a second edge of the first selectable region, the second edge being directly adjacent to the first non-selectable region;
detect movement of the user input from an initial selection point within the first selectable region to the trigger line;
scroll content presented within the scrollable region based at least partly on the movement of the user input; and
reestablish the trigger line at a third edge of the scrollable region that interfaces a second selectable region of the one or more selectable regions.

13. The apparatus of claim 12, wherein establishing the trigger line near the edge of the first selectable region further comprises establishing the trigger line so that the trigger line coincides with the second edge of the first selectable region.

14. The apparatus of claim 12, wherein establishing the trigger line near the first edge of the first selectable region further comprises establishing the trigger line so that the trigger line is within a portion of the first selectable region nearest to the first edge of the first selectable region.

15. The apparatus of claim 12, wherein establishing the trigger line near the first edge of the first selectable region further comprises establishing the trigger line so that the trigger line is within a portion of the non-selectable region of the one or more non-selectable regions nearest to the first edge of the first selectable region.

16. The apparatus of claim 12, wherein scrolling the content within the scrollable region comprises scrolling the content at a variable rate that is slower at a first time at which the user input is within the scrollable region than at a second time which the user input is outside the scrollable region.

17. The apparatus of claim 12, having further computer-executable instructions stored thereupon which, when executed by the computer, cause the computer to select the content between the initial selection point and a final selection point of the user input.

18. The apparatus of claim 12, having further computer-executable instructions stored thereupon which, when executed by the computer, cause the computer to stop scrolling the content after a threshold amount of the second selectable region of the one or more selectable regions has scrolled into the scrollable region.

19. A computer-implemented method comprising:
presenting a user interface comprising a scrollable region having one or more selectable regions and one or more non-selectable regions, a first selectable region of the one or more selectable regions being adjacent to a first non-selectable region of the one or more non-selectable regions;
detecting a user input at an initial selection point within the first selectable region of the one or more selectable regions;
determining whether a first edge of the scrollable region interfaces a visible portion of the first selectable region;
based at least partly on a first determination that the first edge of the scrollable region interfaces the visible portion of the first selectable region, establishing a trigger line at the first edge of the scrollable region;
based at least partly on a second determination that the first edge of the scrollable region does not interface the visible portion of the first selectable region, establishing the trigger line at a second edge of the first selectable region, the second edge interfacing the first non-selectable region of the one or more non-selectable regions;
determining whether the user input has intersected the trigger line;
based at least partly on a third determination that the user input has intersected the trigger line, scrolling content presented within the scrollable region;
reestablishing the trigger line at a third edge of the scrollable region that interfaces a second selectable region; and
selecting the content between and including the initial selection point and a final selection point of the user input.

20. The method of claim 19, wherein scrolling the content presented with the scrollable region comprises scrolling the content at a variable rate that is slower at a first time at which the user input is within the scrollable region than at a second time at which the user input is outside the scrollable region.

* * * * *